United States Patent [19]
Luft

[11] 3,845,629
[45] Nov. 5, 1974

[54] DUAL STATION THROTTLE AND SERVICE BRAKE CONTROL MEANS

[75] Inventor: Robert G. Luft, Wildwood, Ill.

[73] Assignee: International Harvester Company, Chicago, Ill.

[22] Filed: Mar. 26, 1973

[21] Appl. No.: 345,046

Related U.S. Application Data

[60] Division of Ser. No. 224,700, Feb. 9, 1972, Pat. No. 3,743,064, which is a continuation-in-part of Ser. No. 52,221, July 6, 1970, abandoned.

[52] U.S. Cl. .............................................. 60/719
[51] Int. Cl. ........................................... F01b 21/02
[58] Field of Search............... 123/197 E; 60/719, 180/54

[56] References Cited
UNITED STATES PATENTS

| | | | |
|---|---|---|---|
| 1,223,316 | 4/1917 | Curtiss | 60/97 R |
| 2,838,298 | 6/1958 | Henderson | 60/97 R |

Primary Examiner—Edgar W. Geoghegan
Assistant Examiner—Allen M. Ostrager
Attorney, Agent, or Firm—Ronald C. Kamp; Floyd B. Harman

[57] ABSTRACT

A means for controlling the service brakes and both engines of a dual drive train vehicle having a pair of operator stations. Each station has manually actuated brake and throttle valves capable of metering air pressure respectively to the service brakes and an engine control means. A selector valve directs air pressure to the valves in only one station and check valve means isolates the service brakes and the engine control means from the valves in the other station. An electrical circuit is provided to permit independent control of either of the two engines during starting.

3 Claims, 3 Drawing Figures

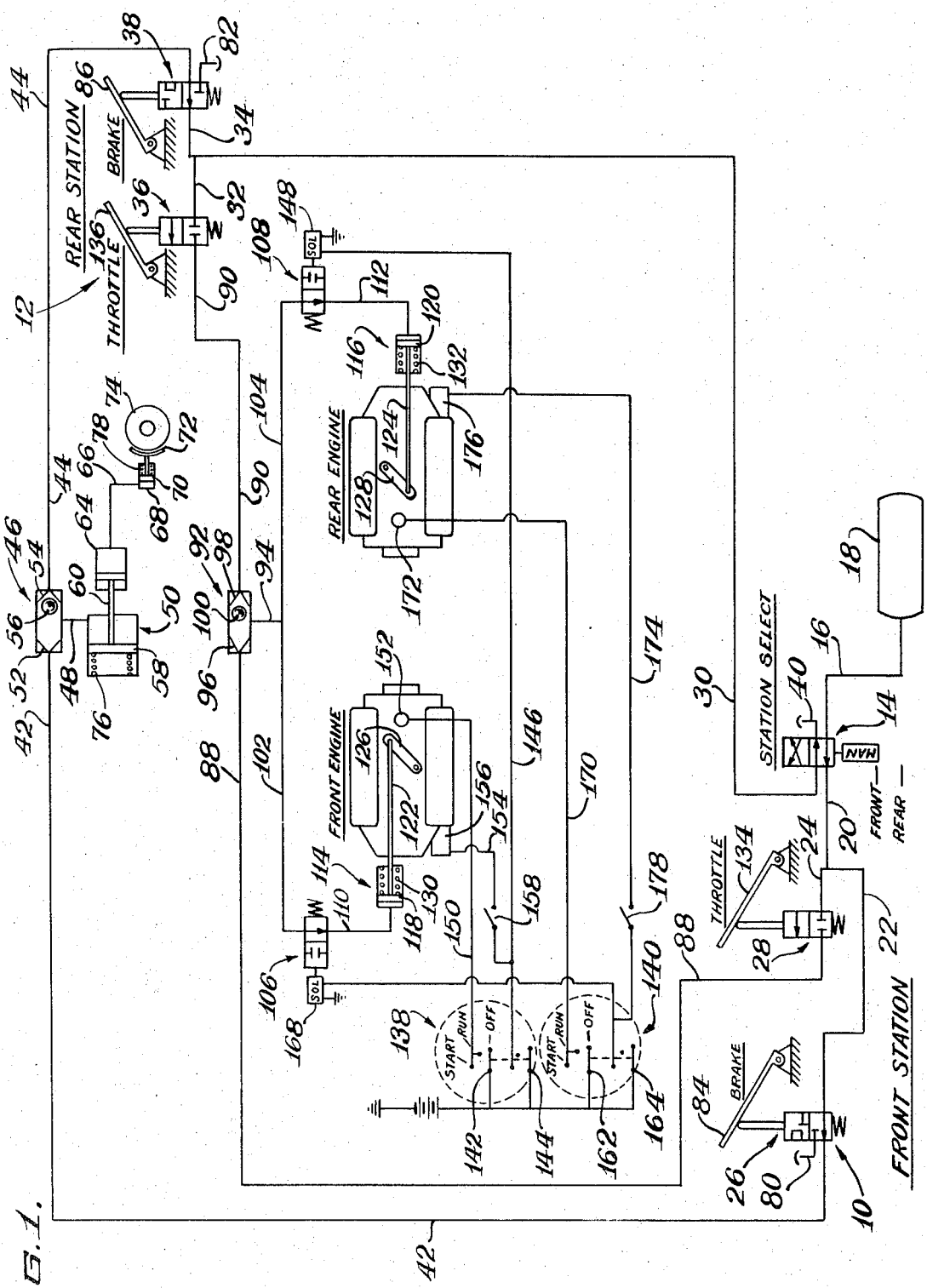

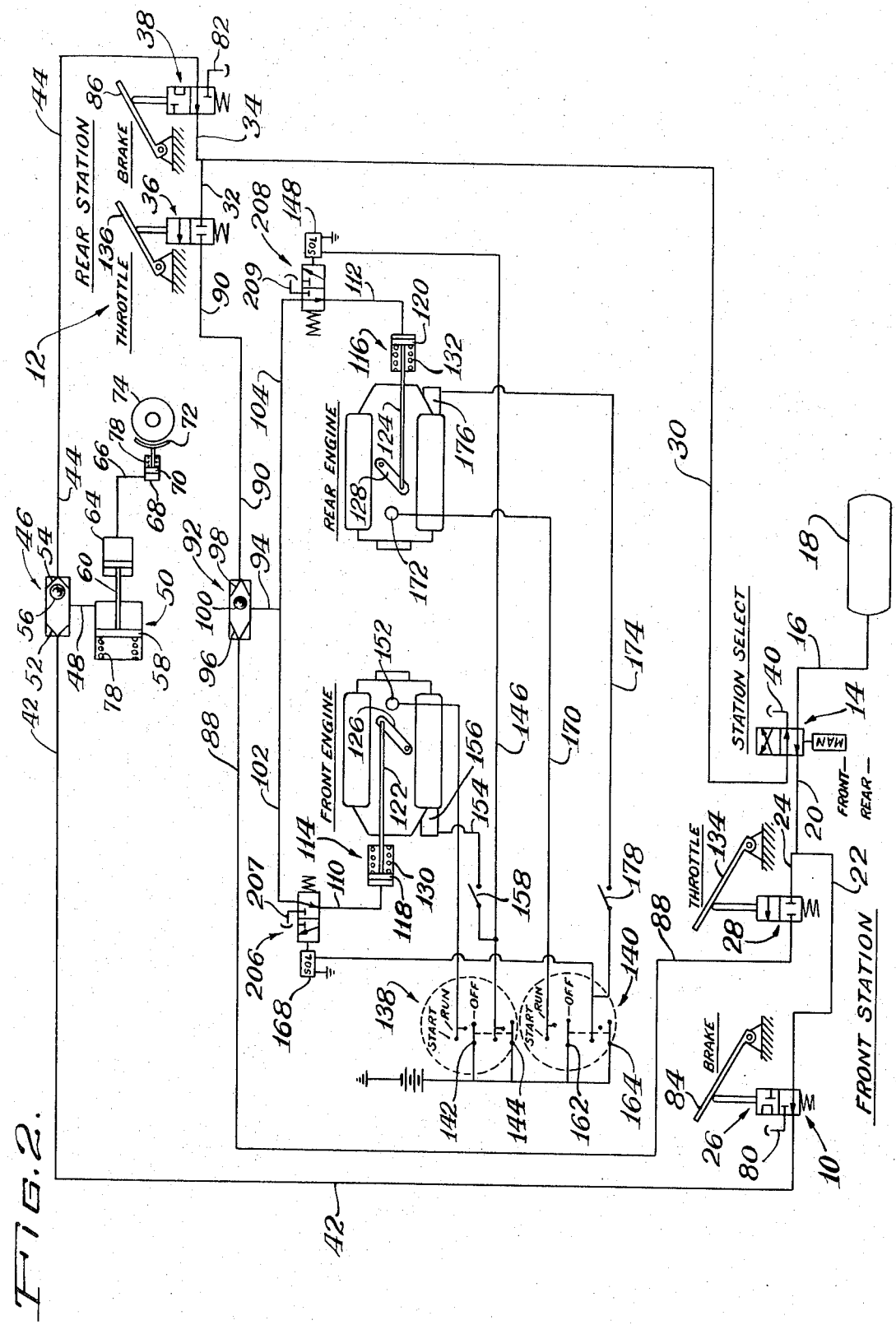

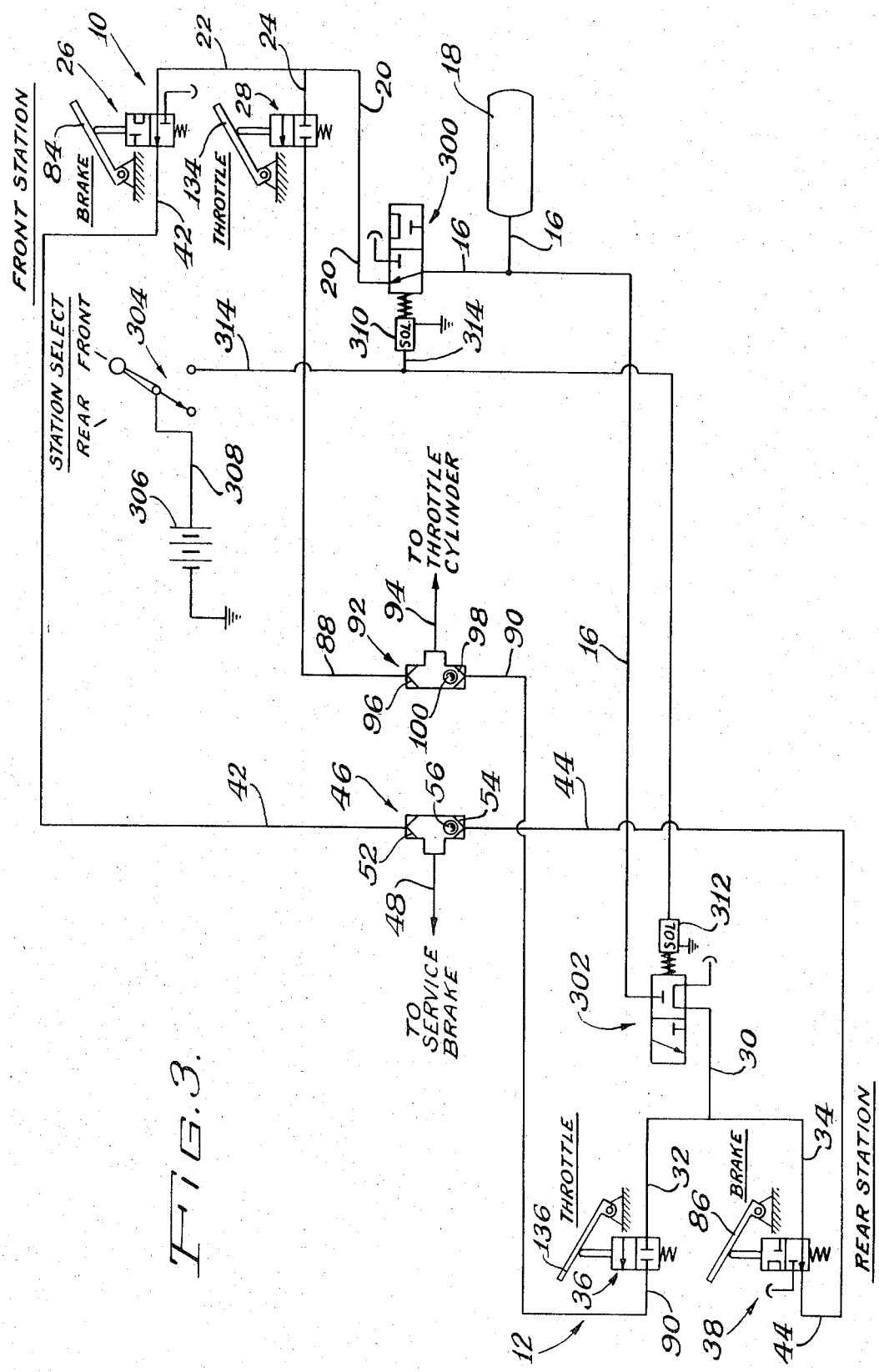

DUAL STATION THROTTLE AND SERVICE BRAKE CONTROL MEANS

This is a division of application Ser. No. 224,700, filed Feb. 9, 1972, now U.S. Pat. No. 3,743,064, which application was a continuation-in-part of Ser. No. 52,221 filed July 6, 1970 now abandoned.

CROSS REFERENCE TO RELATED APPLICATIONS

This invention is related to that disclosed and claimed in the application of Robert G. Luft and Edward A. Bott entitled DRIVE TRAIN FOR LOW PROFILE VEHICLE, Ser. No. 796,371 filed Feb. 4, 1969, issued as U.S. Pat. No. 3,614,989.

BACKGROUND AND SUMMARY OF THE INVENTION

In certain large vehicles, such as those utilized to tow the jumbo jet aircraft, the size of the machine requires a control compartment or operator's station at each end thereof. Such dual operator stations are provided so that the operator may be positioned at the forward end of the vehicle regardless of its direction of travel. These dual stations impose the requirement for controlling both the service brakes and the engine speed or power output from either station. Further, in addition to the operator being responsible for control of the vehicle itself, an attendant will often accompany the operator and will have the responsibility for making various connections between the vehicle and the aircraft in order to provide ground service for the aircraft. This attendant will frequently ride in the non-selected station, i.e., that station not occupied by, and not functional for the operator. During the routine of connecting and disconnecting the various apparatus with the aircraft, the attendant's necessarily frequent ingress to and egress from the non-selected station could conceivably result in accidental actuation of one of the control pedals in this station. Such accidental actuation of one of the controls would be completely unexpected by the operator in the selected station affording the operator no opportunity to compensate. As a result, unintended sudden stopping or acceleration of the vehicle would present a hazard to both personnel, the aircraft and the vehicle. It is therefore highly desirable to render the controls in the non-selected station completely inoperative.

Tow tractors of the type capable of pulling the jumbo jet aircraft require considerable tractive effort. It has been found desirable to provide dual engine and drive trains in order to provide the needed tractive effort and also to preclude complete immobility of the vehicle if one of the engines should be rendered inoperative. Hence, a control must be provided which permits actuation from either station and which also controls both of the engines. Further, starting of the dual engines presents a problem in that a control which is capable of actuating both engines would cause fuel to flow into the one engine while the other engine is being started. Hence, the engine not being started, would be flooded with fuel and make its starting difficult after the first engine had been started and was operating.

It is, therefore, an object of the present invention to provide a control means for both the service brakes and the engine means which is capable of being selectively actuated from either of a pair of stations on the vehicle.

It is also an object of the present invention to provide such a control means which will permit actuation from either station while simultaneously precluding actuation thereof from the other or non-selected station.

It is also an object of this invention to provide a means for simultaneously controlling a pair of engines from a selected one of two operator's stations.

A further object is to provide such a dual station control for a pair of engines with means for disconnecting either of the engines from the simultaneous control means therefor while starting the other of the engines.

It is still another object of this invention to provide a means for setting and locking the engine speed at any given level, and to permit the engine speeds to be maintained at that setting independent of the foot throttle in either compartment.

It is still another object of this invention to provide a means for automatically permitting one engine to return to its idle setting while the other engine is being started.

These, and other objects of the present invention and many of its attendant advantages will become apparent upon a perusal of the following description and the accompanying drawings, wherein:

FIG. 1 is a schematic view of a control means according to the present invention;

FIG. 2 is a schematic view, similar to FIG. 1, of a second embodiment of such a control means; and FIG. 3 is a schematic view of a third embodiment of the present invention.

DESCRIPTION OF A PREFERRED EMBODIMENT

Referring now to the embodiment illustrated in FIG. 1, a vehicle, which may be of the type disclosed and claimed in patent application Ser. No. 796,371 filed Feb. 4, 1969, now U.S. Pat. No. 3,614,989, is provided with a front station schematically indicated at 10 and a rear station schematically indicated at 12. The front station 10 is provided with a station selector valve 14, which is of the four-port, two-position type. A conduit 16 connects with one port of the valve 14 and with a tank 18 which contains air under pressure. A conduit 20 connects with a second port of the valve 14 and branches into conduits 22 and 24 to provide communication respectively with the brake valve 26 and the throttle valve 28 in the front station 10. The conduit 30 branches into conduits 32 and 34 to provide communication between the station selector valve 14 and the throttle valve 36 and brake valve 38 respectively in the rear station 12. The fourth port in the station selector valve 14 is vented to atmosphere through conduit 40. With the station selector valve 14 in its front position, as illustrated in FIG. 1, the conduit 16 is in fluid communication with the conduit 20 and, hence, air pressure is provided from the tank to each of the brake valve 26 and throttle valve 28 in the front station. Simultaneously, the conduit 30 is connected with the conduit 40 so that the throttle valve 36 and brake valve 38 in the rear station are connected with the atmosphere. When the station selector valve 14 is manually moved to its rear position, the conduit 16 is placed in communication with the conduit 30 while the conduit 20 is placed in communication with the conduit 40 and, hence, with the atmosphere. Each of the brake valves 26 and 38 are of the two-position type and are spring biased into the position shown in FIG. 1. A conduit 42 connects with the brake valve 26 and a conduit 44 connects with the brake valve 38. A T connector 46 is in fluid communication with the other end of the conduits 42 and 44 and a conduit 48 extends between the middle of the T connector and an air cylinder 50. The T connector 46 is provided with a pair of seats 52 and 54 and includes a shuttle valve 56 which is capable of seating on the seat 52 or 54 in order to preclude communication respectively between conduits 42 and 44 with the conduit 48. A piston 58 is reciprocally mounted within the air cylinder 50 and is connected by means of a rod 60 to a piston 62 reciprocally mounted within a hydraulic cylinder 64. The hydraulic cylinder 64 is connected through conduit 66 with the individual wheel cylinders, such as shown at 68. Each wheel cylinder 68 includes a piston 70 which is mechanically linked with a brake means 72 capable of engaging a rotatable member 74 associated with the vehicle wheels. A spring means 76 within the air cylinder 50 urges the piston and its rod 60 toward its extended position and it is only the presence of air pressure provided through the conduit 48 which retracts the piston 58 and its rod 60 to release the brake. As will be apparent, extension of the piston and rod 60 will cause the piston 62 to expel hydraulic fluid from the hydraulic cylinder 64 through the line 66 to the wheel cylinder 68 to cause the brake member 72 to be urged into engagement with the rotatable element 74 against the bias of a spring 78 trapped within the wheel cylinder 68. Exhaust conduits 80 and 82 are provided to communicate with the brake valves 26 and 38 respectively. The spring bias provided for each of the brake valves 26 and 38 urges the valve into the position shown in FIG. 1 so that the conduits 22 and 34 are in communication with the conduits 42 and 44 respectively. A brake pedal 84 is provided in the front station and when depressed will urge the brake valve 26 against the bias of its spring toward the position in which the conduit 22 is blocked and the conduit 42 is placed in communication with the exhaust conduit 80. This permits controlled exhaust of air pressure from the air cylinder 50 thereby allowing the spring 76 to urge the piston 58 and the rod 60 toward its extended position and, hence, applying the brake 72. A similar brake pedal 86 is provided in the rear station and is capable of moving the valve 38 against the bias of its spring toward a position in which the conduit 34 is blocked and the conduit 44 is in communication with the exhaust conduit 82. When the station selector valve is in the front position air pressure will be present in conduit 42 urging the shuttle valve 56 against the seat 54 and isolating the conduit 44 from communication with the conduit 48. Hence, manipulation of the pedal 86 in the rear station when the station selector valve is in its front position will not affect, in any way, the pressure within the air cylinder 50. Hence, it will be seen that with the station selector valve so positioned, any actuation of the brake pedal 86 in the rear station will have no affect upon the service brakes. When the station selector valve 14 is moved to the rear position the opposite will be true. That is, air pressure will be present in conduit 44 urging the shuttle valve 56 against the seat 52 and isolating the conduit 42 from the conduit 48. Hence, with the station selector valve 14 in its rear position, manipulation of the brake pedal 84 will not affect the condition of the service brakes.

Considering now the throttle control, a conduit 88 connects with the throttle valve 28 and a similar conduit 90 connects with the throttle valve 36. These two conduits are connected with a T connector 92 and a conduit 94 connects with the T connector 92 at a point intermediate the connection with conduits 88 and 90. The T connector 92 is provided with a pair of seats 96 and 98 and a shuttle valve 100 which is capable of seating on either seat 96 and 98 to block communication between conduits 88 and 90 respectively with the conduit 94. The conduit 94 branches into conduits 102 and 104 which conduits are respectively connected with valves 106 and 108. Each of these valves 106 and 108 are normally spring biased to the position illustrated in FIG. 1 in which the conduit 102 is in communication with the conduit 110 and the conduit 104 is in communication with the conduit 112. The conduits 110 and 112 communicate with engine power control cylinders 114 and 116 respectively. Each of the control cylinders 114 and 116 include a piston 118 and 120 and a piston rod 122 and 124 respectively. Each of the rods 122 and 124 are connected with a control rod 126 and 128 respectively. The control rods 126 and 128 on the front and rear engines are arranged to control the speed and power output of the engines, that is, the rod would be connected with the carburetor on a spark-ignited engine. A spring 130 and 132 in the respective control cylinders 114 and 116 urge the pistons 118 and 120 toward their retracted position in which the arms 126 and 128 have conditioned the carburetor for idle running of the engines. Each of the throttle valves 28 and 36 are spring biased toward the position shown in FIG. 1 in which communication between the conduits 24 and 88 are blocked and conduits 32 and 90 are blocked. The front station is provided with a throttle pedal 134 which engages the throttle valve 28 and, upon depression thereof, is capable of urging the throttle valve 28 against the bias of its spring toward the position in which communication is provided between the supply conduit 24 and conduit 88. When the station selector valve 14 is positioned for front operation, air pressure is provided to conduit 24 so that upon depression of the throttle pedal 134, air pressure can be metered to the conduit 88 to both of the control cylinders 114 and 116. The amount of pressure so metered to the cylinders will determine the speed and power output of both the front and rear engine due to a movement of the pistons 118 and 120. A similar throttle pedal 136 is provided in the rear station 12 and is capable of moving the throttle valve 36 against the bias of its spring toward a position in which it can meter the flow of air pressure from the conduit 32 to the conduit 90. However, with the station selector valve 14 in its front position, the conduits 30 and 32 will be vented to atmosphere through the conduit 40 and, hence, manipulation of the throttle pedal 136 will have no affect upon the condition of the control arms 126 and 128. With the station selector valve 14 moved to the rear position, air pressure would be present in conduit 32 to permit the metering of fluid into the conduit 90 by manipulation of the throttle pedal 136 in order to control the speed and power output of the front and rear engines in a manner similar to that described in connection with the throttle valve 28 in the front station. The shuttle valve 100 and the seats 96 and 98 serve to isolate the non-selected throttle valve from the system so that it will not affect the operation or condition of the engines as determined by the throttle valve in the selected station.

Considering now the electrical starting system for the front and rear engines, there is provided a double-pole, three-position switch 138 and 140 which are used for starting the front and rear engines respectively. Considering first the switch 138 and the starting of the front engine, electrical power from a battery is supplied through electrical conductors or wires to the input posts 142 and 144 of the dual-post three-position switch 138. In the off position, as illustrated in FIG. 1, the battery remains unconnected with any other conductors. When the switch is moved to the start position, electrical contact is established between the post 144 and conductor 146 which energizes solenoid 148 shifting the valve 108 to a position in which communication between conduits 104 and 112 is blocked. Simultaneously, contact is established between the post 142 and a conductor 150 which connects with the ignition system for the front engine as schematically illustrated by 152. An electrical conductor 154 is connected between the conductor 146 and the starter motor 156 for the front engine. A normally open switch 158 in the conductor 154 may be manually closed by the operator to permit energizing the starting motor 156 in order to start the engine. Under these conditions, with the solenoid 148 energized and the valve 108 shifted to block communication between conduits 104 and 112, manipulation of the throttle pedal 134 in the front station 10 will permit the operator to change the position of the control arm 126 in order to obtain sufficient fuel for starting the front engine. Such manipulation of the throttle pedal 134 will, however, not affect the control arm 128 since air pressure appearing in conduit 104 will be blocked from communicating with conduit 112 and, hence, with the control cylinder 116. Such an arrangement precludes pump flooding of the rear engine with fuel while the front engine is being started. When the switch 138 is then moved to the run position, as shown in FIG. 1, contact between the post 144 and the conductor 146 will be broken while direct contact is maintained between the post 142 and the electrical conductor 150. This permits the supply of electrical power to the ignition system 152 of the front engine while simultaneously de-energizing the solenoid 148 and permitting the valve 108 to move to the position shown in FIG. 1 in which communication is again established between conduits 104 and 112. By arranging the starter switch 159 so that it is in the circuit with the conduit 146 leading to the solenoid 148, requires that the operator energize the solenoid to isolate the control cylinder 116 from the throttle circuit before he can energize the starter motor 156 in the front engine. Similarly, the starting switch 140 for the rear engine is provided with input posts 162 and 164 which are supplied with electrical power from the battery. When the switch 140 is moved to its start position, contact is established between the post 164 and a conductor 166 leading to the solenoid 168 associated with the valve 106. Energizing the solenoid 168 will move the valve 106 to its closed position in which communication between conduits 102 and 110 are blocked. This will isolate the front engine from manipulation of the throttle pedal 134 and permit it to idle while the rear engine is being started. In the start position the post 162 will be connected with an electrical conductor 170 which energizes the electrical ignition system 172 on the rear engine. A conductor 174 is energized simultaneous with the energization of conductor 166 and leads to the starter motor 176 on the rear engine. A normally open starter switch 178 is provided in the conductor 174 for actuation of the starter motor.

It should be noted that the first engine started is not dependent upon the normal idle setting for the carburetor to determine its speed during starting of the other engine. That is, if the front engine was started first, then the position of the piston 118 within the cylinder 114 can be controlled by the deression of throttle pedal 134. If the operator were to depress the throttle pedal 134 an amount to achieve the desired speed for the front engine during warm-up and while maintaining the throttle pedal in that position move the starter switch 140 for the rear engine to start position the solenoid 168 will be energized blocking communication between conduit 102 and 110, but also trapping the air pressure within the conduit 110 and the head end side of the cylinder 114. This permits the operator to set the speed of the front engine at something other than the normal idle speed while he is performing the procedure for starting the rear engine. However, once he has so locked in the speed for the front engine, it would be necessary for the operator to turn the front engine switch 138 to its run position in order to permit him control of the rear engine by the throttle pedal 134.

It should further be noted that the solenoids 148 and 168 provide in conjunction with the switches 138 and 140 an automatic speed control for the operator separate from the throttle pedal 134. That is, with both engines started and the switches 138 and 140 both conditioned for run, it would be possible for the operator to depress the throttle pedal 134 to achieve the desired speed for the vehicle, and with the throttle pedal maintained in that position, to move both switches 138 and 140 to the start position. This would actuate both solenoids 148 and 168 shifting both valves 106 and 108 to their block position trapping fluid in the conduits 110 and 112. The engines would thereafter continue to operate at the speed determined by the prior setting of the throttle pedal 134 even though the operator released the pedal to permit the spring to bias the throttle valve 28 to its block position. While this arrangement does provide a convenient means for controlling the speed of the vehicle in long haul situations, it does require the presence of mind of the operator to return the switches to the run position in order to permit the engines to return to their idle settings. In some applications, it may be desirable to require the operator to use the throttle pedal at all times in order to control the motion of the vehicle.

The embodiment illustrated in FIG. 2 discloses a valve arrangement which does not permit the operator to utilize the solenoids as a means for determining the speed of the vehicle during normal operations. In this embodiment all of the elements are exactly the same as that described in connection with FIG. 1 except for the solenoid operated valves. Instead of being of the two-position, two-port type, as are the valves 106 and 108 in the embodiment of FIG. 1, the comparable valves 206 and 208 in the embodiment of FIG. 2 are of the two-position, three-port type. The valve 206 is provided with a conduit 207 which is vented to atmosphere and the valve 208 is provided with a similar conduit 209. In the normal position determined by the spring bias, the valve 206 is positioned so that communication is established between conduit 102 and 110. However, when the solenoid 168 is energized, the valve is moved to a position in which conduit 110 is connected with conduit 207 and conduit 102 is blocked. This venting of conduit 110 to the atmosphere permits the spring 130 within the control cylinder 114 to return the piston 118 to its normal idle position. Simultaneously, conduit 102 is blockd so that, with the solenoid 168 energized, manipulation of the throttle pedal 134 will not affect the control cylinder 114. Valve 208 is similarly arranged so that with the solenoid 148 energized conduit 112 is vented to atmosphere and conduit 104 is blocked.

Referring now to FIG. 3, the schematic view has been simplified to illustrate the operation of a single engine from both front and rear stations. However, the start-run electrical circuit and associated valving shown in either FIG. 1 or FIG. 2 could be utilized in conjunction with the dual station embodiment shown in FIG. 3 for dual engine operation, if desired.

In the FIG. 3 embodiment the air under pressure in the tank 18 is either directed to or isolated from the front and rear stations, 10 and 12 respectively, by means of a pair of solenoid-operated valves 300 and 302. The positions of the valves 300 and 302 are controlled and coordinated by the station selector switch 304, which may be located in the front station 10 for convenience. The switch 304 is connected with a source of electrical energy, such as battery 306, by means of a conductor 308. The switch 304 has two positions. When in its FRONT position it isolates the battery 306 from the solenoids 310 and 312 of the valves 300 and 302 respectively. These valves will then be spring biased to the positions shown in FIG. 3, in which the conduit 1 leading from the tank 18 is blocked by the valve 302 and is connected with the conduit 20 by the valve 300. The brake and throttle valves 38 and 36 in the rear station 12 will be connected with atmosphere and any actuation of pedals 86 and 136 will have no affect on the brakes of the engine speed. The air pressue present in conduits 22 and 24 will permit actuation of the brakes and engine throttle upon manipulation of the pedals 84 and 134 respectively. The T connectors 46 and 92 serve the same function here as in the two embodiments previously described.

When the switch 304 is moved to its REAR position, the conductor 308 is connected with the conductor 314 and both solenoids 310 and 312 are actuated causing each of the valve 300 and 302 to be shifted toward its associated solenoid. When shifted, the valve 300 blocks the conduit 16 isolating the valves 26 and 28 from the source of air pressure and rendering both of them ineffective. The valve 302, when so shifted, connects the conduit 16 with the conduit 30 and supplies air under pressure to the valves 36 and 38 through conduits 32 and 34 respectively.

While three embodiments of the present invention have been disclosed herein, it is to be understood that various changes and modifications may be made without departing from the scope of the invention as determined by the appended claims.

What is claimed is:

1. Control means for a vehicle having a pair of engines, each engine including a speed and power operator means, an ignition system and a starter motor, and a first operator station; the control means comprising:

a throttle valve means in the first station;
conduit means connecting the throttle valve means with said operator means on both engines;
a pair of solenoid valve means interposed in the conduit means between the throttle valve means and operator means and when energized blocking communication therebetween;
a first electrical switch capable of energizing the starter motor and the ignition system of one engine while simultaneously energizing the solenoid valve means on the other engine, and a second electrical switch capable of energizing the starter motor and ignition system of said other engine while simultaneously energizing the solenoid valve means on said one engine.

2. The invention according to claim 1, wherein said solenoid valve means when energized traps fluid in the conduit means between the operator means to retain the operator means at a given setting.

3. The invention according to claim 2, wherein said operator means is biased to an idle position and said solenoid valve means when energized connects the operator means with atmosphere.

* * * * *